United States Patent [19]
Blad

[11] 4,419,170
[45] Dec. 6, 1983

[54] AUTOMATED LAY-UP MACHINE

[75] Inventor: Leiv H. Blad, Van Nuys, Calif.

[73] Assignee: Lockheed Corporation, Burbank, Calif.

[21] Appl. No.: 382,497

[22] Filed: May 27, 1982

[51] Int. Cl.³ .............................................. B32B 31/00
[52] U.S. Cl. ................................... 156/361; 156/522; 156/523
[58] Field of Search ............... 156/523, 525, 526, 575, 156/543, 510, 522, 353, 361–363, 584, 542, 530, 425, 431, 433, 173, 175, 195

[56] References Cited

U.S. PATENT DOCUMENTS

| | | | |
|---|---|---|---|
| 3,574,040 | 4/1971 | Chitwood et al. | 156/522 |
| 3,775,219 | 11/1973 | Karlson et al. | 156/526 X |
| 3,810,805 | 5/1974 | Goldsworthy et al. | 156/525 X |
| 3,975,226 | 8/1976 | Boettcher | 156/361 X |
| 4,133,711 | 1/1979 | August et al. | 156/353 |
| 4,285,752 | 8/1981 | Higgins | 156/522 X |
| 4,292,108 | 9/1981 | Weiss et al. | 156/353 X |
| 4,328,061 | 5/1982 | Off et al. | 156/361 X |

*Primary Examiner*—David A. Simmons
*Attorney, Agent, or Firm*—Frederic P. Smith

[57] ABSTRACT

An automated lay-up machine for the fabrication of composite structures comprising an upper carriage (12) which carries a material handling system (14) and a lower carriage which carries a laying head (46). The upper and lower carriages each have a selected number of degrees of freedom of movement to allow positioning of the material handling system and the laying head. Means (20, 32, 50, 60, 145) are provided to move and control the motion of the upper and lower carriages. The movement of the upper carriage is slaved to the movement of the lower carriage to allow the material handling system to dispense material to the laying head. The material handling system and the laying head can also rotate to provide an extra degree of freedom, with the rotation of the material handling system also being slaved to the rotation of the laying head. The laying head can also be independently moved normal to a work surface.

12 Claims, 5 Drawing Figures

AUTOMATED LAY-UP MACHINE

TECHNICAL FIELD

The invention relates to the field of machines suitable for the fabrication of composite structures and, in particular, to an automated machine suitable for laying up resinous and/or fibrous materials.

BACKGROUND ART

In this era of rapidly rising labor costs and increasing disinterest in factory work, it has become a necessity to move toward automation of manufacturing processes. One of the more recent manufacturing processes utilizes composite materials in the form of dry fibers coated with wet resin or preimpregnated fiber tape to form laminated structures or reticulated structures. Such structures are illustrated in U.S. Pat. No. 3,962,393 entitled "Method for Making A Hollow Laminated Article" and U.S. Pat. No. 4,284,679 entitled "Filled Resin Coated Tape". These structures are generally formed by laying such preimpregnated tape or fibrous material, such as fiberglass, graphite or boron filaments, and organic resin, on a mandrel and then curing it by the application of heat and pressure.

In order to have an efficient automated lay-up process, it is necessary that the head laying the material move rapidly and accurately over the surface on which the material is to be laid. Tape laying heads typically used in prior art machines are shown in U.S. Pat. No. 3,574,040 to Chitwood et al and U.S. Pat. No. 3,775,219 to Karlson et al. In these machines, the tape laying heads carry not only the mechanism for laying the tape but also the mechanism for holding the spools of tape and dispensing the tape to the tape laying head. Thus the tape laying heads must of necessity be bulky and weighty and are difficult to maneuver with rapidity and accuracy due to their weight and inertia.

Accordingly, it is a general object of the present invention to provide an improved automated lay-up machine for the fabrication of laminated and reticulated structures.

It is another object of the present invention to provide an improved lay-up machine which can rapidly and accurately layup composite materials.

It is a further object of the present invention to provide an improved lay-up machine in which the laying head has a minimum of bulk and weight.

It is still another object of the present invention to provide an improved lay-up machine in which the laying head can be rapidly and accurately maneuvered.

DISCLOSURE OF INVENTION

An automated lay-up machine for the fabrication of composite structures is provided. The lay-up machine comprises an upper carriage which carries a material handling system and a lower carriage which carries the laying head. The upper and lower carriages each have a selected number of degrees of freedom of movement to allow positioning of the material handling system and the laying head. Means are provided to move and control the motion of the upper and lower carriages. The movement of the upper carriage is slaved to the movement of the lower carriage to allow the material handling system to dispense material to the laying head. The material handling system and the laying head can also rotate to provide an extra degree of freedom, with the rotation of the material handling system also being slaved to the rotation of the laying head. The laying head can also be independently moved normal to work surface.

The novel features which are believed to be characteristic of the invention, both as to its organization and its method of operation, together with further objects and advantages thereof, will be better understood from the following description in connection with the accompanying drawings in which a presently preferred embodiment of the invention is illustrated by way of example. It is to be expressly understood, however, that the drawings are for purposes of illustration and description only are not intended as a definition of the limits of the invention.

BRIEF DESCRIPTION OF THE DRAWINGS

FIG. 5 is a cross-sectional view of the present invention taken along line 5—5 of FIG. 2.

BEST MODE FOR CARRYING OUT THE INVENTION

Figure 1:
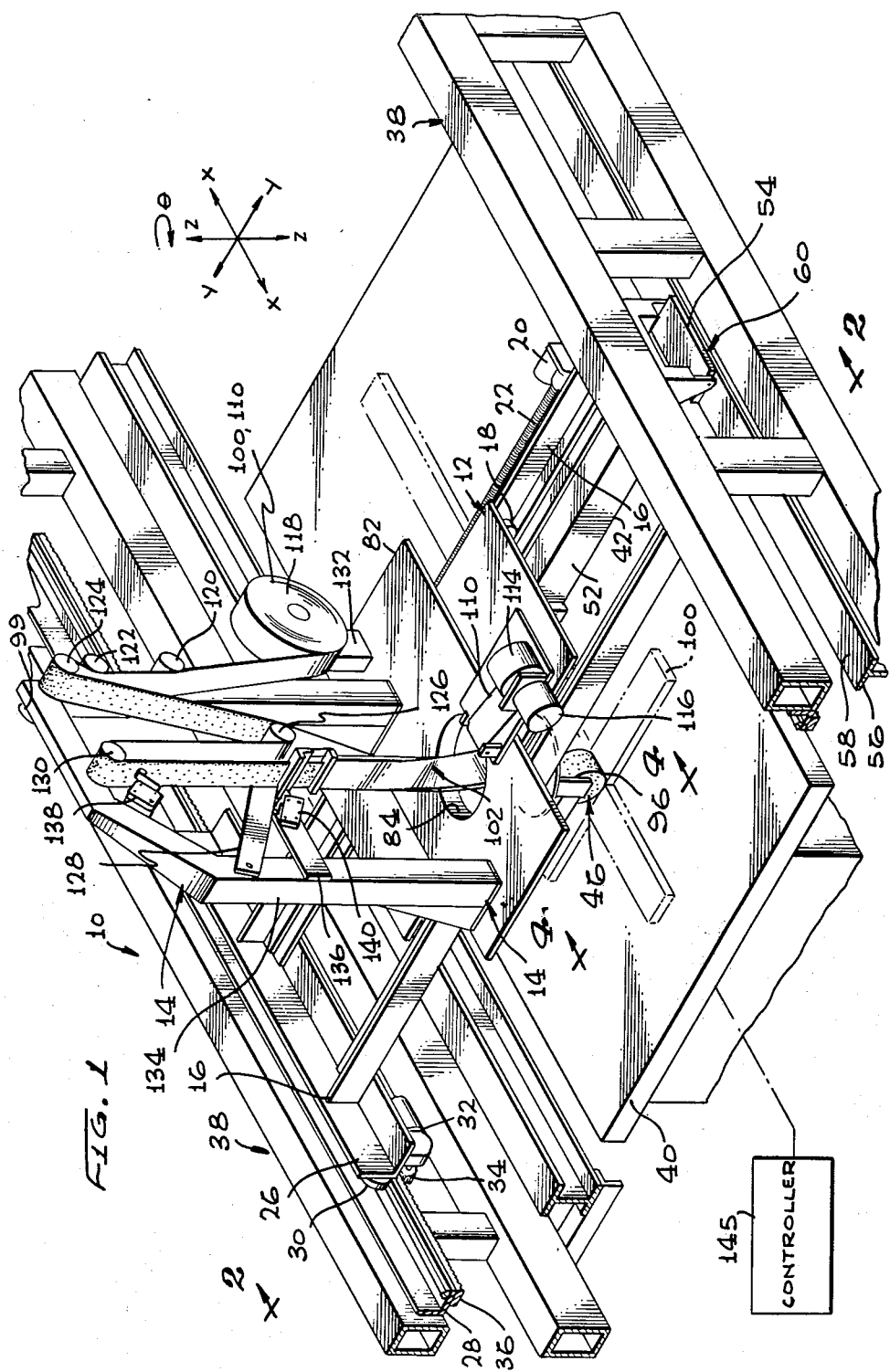
FIG. 1 is a perspective view of the present invention.
Figure 2:
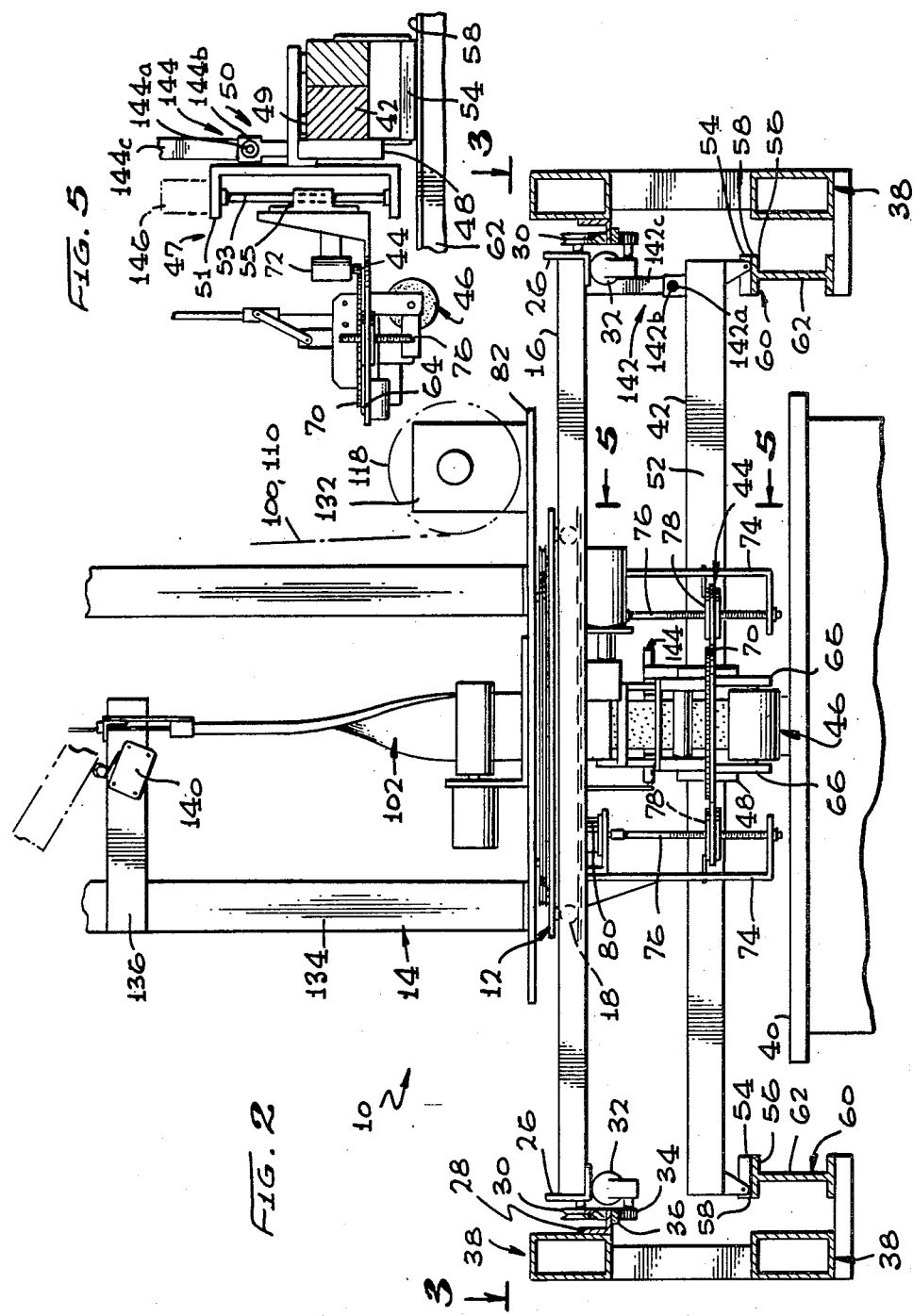
FIG. 2 is a cross-sectional view of the present invention taken along line 2—2 of FIG. 1 with the material handling system and the tape laying head rotated ninety degrees.
Figure 3:
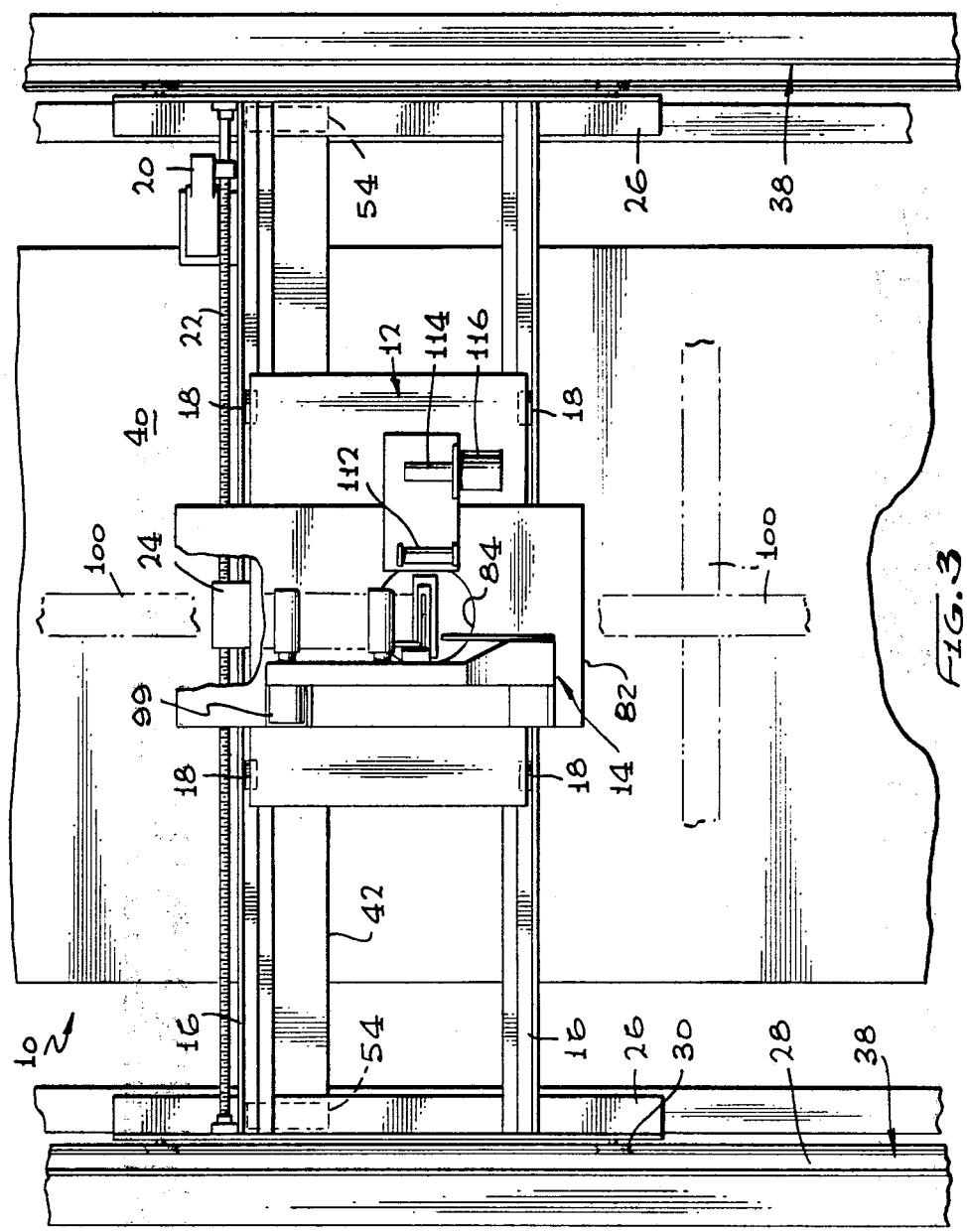
FIG. 3 is a top plan view of the present invention taken along line 3—3 of FIG. 2.

Referring now to FIG. 1, a perspective view of an automated lay-up machine 10 of a preferred embodiment of the present invention is illustrated. The lay-up machine 10 has an upper carriage 12 to which is coupled a material handling system 14. The upper carriage 12, as shown also in FIGS. 2 and 3, is mounted on a pair of rails 16 by means of rollers 18 and is driven in the Y-direction along rails 16 by motor 20 which rotates worm screw drive shaft 22 through worm screw drive nut 24 coupled to the upper carriage 12. Rails 16 are mounted on beams 26 which ride on beams 28 by means of rollers 30. Attached to the underside of beams 26 are motors 32 which drive gears 34 which engage the toothed undersurface 36 of beams 28 and thus propel upper carriage 12 in the X-direction. Beams 28 are coupled to a support structure 38 which carries beams 28 and upper carriage 12 a selected distance above the workbed or lay-up tool 40.

The lay-up machine 10 additionally has a beam 42 to which is coupled, as shown in FIG. 5, a lower carriage 44 for the tape laying head 46 to enable the tape laying head 46 to be driven in the X and Y directions. The lower carriage 44 is coupled to the beam 42 through support 47, consisting of bracket 51, shaft 53 and bearing 55. Support 47 is attached to winding 48, supported by roller bearings 49, which forms the moving coil (rotor) of a linear induction motor 50, the beam 42 having a surface pattern 52 of conductive and non-conductive regions which forms the stator of the linear induction motor 50. Such a linear induction motor 50 is marketed by the Xynetics Company of Santa Clara, Calif. and the principles of operation thereof are described in U.S. Pat. No. Re. 27,436 to Sawyer. The linear induction motor 50 causes the lower carriage 44 to be moved rapidly and precisely in the Y direction. The beam 42 is coupled to windings 54 which are supported on air bearings by beams 56 which have a surface pattern 58 thereon of conductive and non-conductive regions. As above, the windings 54 and the beams 56 with the surface pattern 58 form the rotors and stators of linear induction motors 60 which cause the beam 42 and the lower carriage 44 to be moved rapidly and precisely in the X direction. The beams 56 are coupled to support structures 62 which carry the beams 56 and thus the lower carriage 44 a selected distance above the lay-up tool 40.

Figure 4:
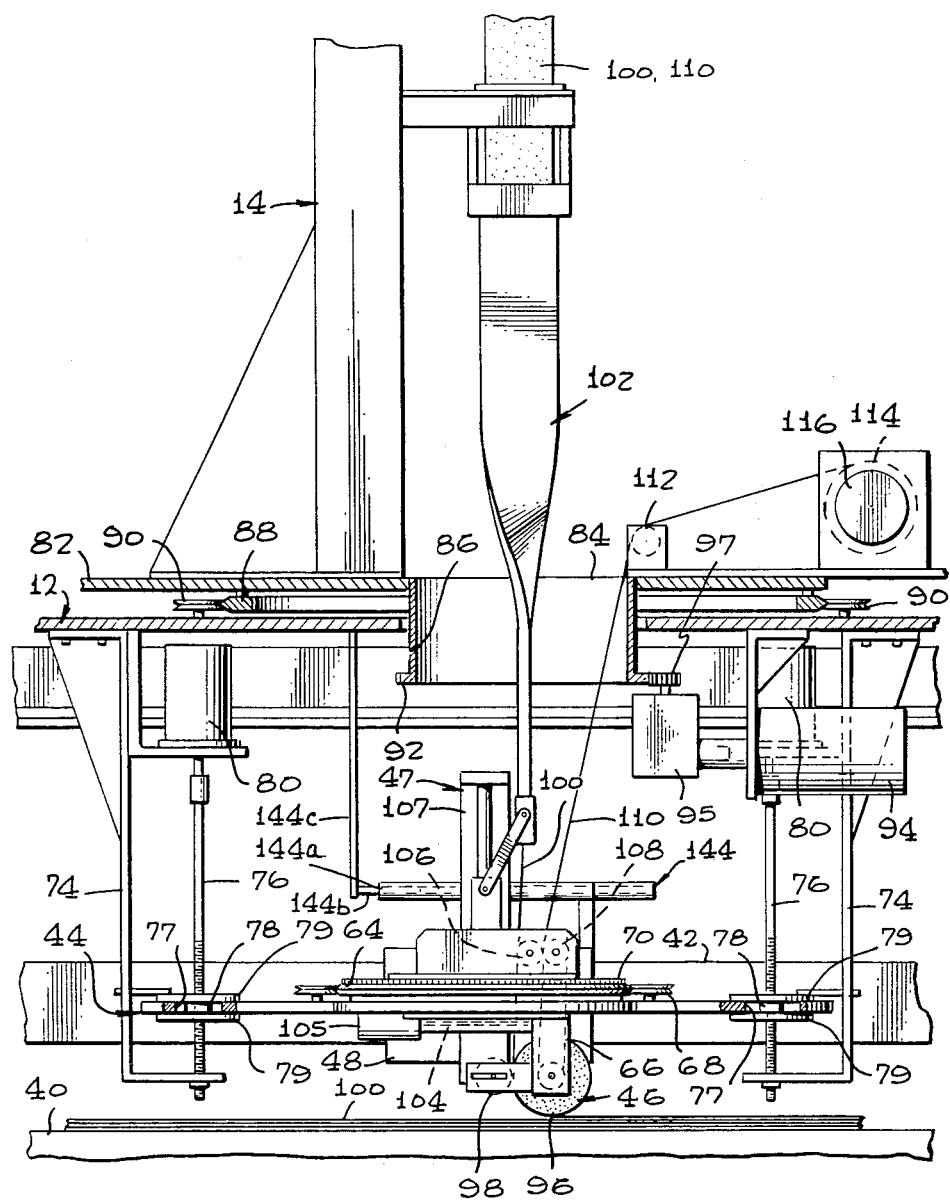
FIG. 4 is an enlarged cross-sectional view of the present invention taken along line 4—4 of FIG. 1.

The laying head 46 is also adapted to be driven in the Z direction and around the Z axis an angle $\theta$. Referring to FIGS. 4 and 5, the laying head 46 is coupled to a circular plate 64 by members 66 which pass through an aperture in the lower carriage 44. The circular plate 64 is supported by grooved rollers 68 coupled to lower carriage 44 and has a ring gear 70 mounted on it which is driven by motor 72. Thus motor 72 acts to drive laying head 46 around the Z axis. The lower carriage 44, in addition to being coupled to the beam 42, is supported by brackets 74 connected to upper carriage 12, worm screw drive shafts 76 and worm screw drive nuts 78, the drive shafts 76 being driven by motors 80 to drive laying head 46 in the Z direction and to apply a Z-direction force to the laying head 46 to apply pressure against the tape being laid on the lay-up tool 40 as explained hereinafter.

The material handling system 14 is also adapted to be driven around the Z axis an angle $\theta$. The material handling system 14 is mounted on a plate 82 which has a circular aperture 84 through it. A hollow cylindrical member 86 is connected to the plate 82 at the periphery of the aperture 84 and has a circular plate 88 attached to it which is supported by grooved rollers 90 which are in turn supported by upper carriage 12. The member 86 has a ring gear 92 coupled to the lower edge of it which is driven by motor 94 through a reduction gear 95 and pinion 97. Thus motor 94 acts to drive plate 82 and material handling system 14 around the Z axis.

The laying head 46 has a primary roller 96 and a secondary roller 98 through which the tape 100 passes to be laid on the surface of the lay-up tool 40 by the rolling action of primary roller 96 against the surface of the lay-up tool 40. The secondary roller 98 is coupled by a gear drive (not shown) to the primary roller 96. The tape 100 is guided by guide 102, by rollers 106, 108, coupled to primary roller 96 by chain drive 109, where a paper backing 110 is removed by routing it between rollers 106, 108, passed over roller 112 and wound on spool 114 driven by slip clutch motor 116, rollers 106, 108 acting to assist in the downward pulling action of the tape 100 by pulling on the paper backing 110. A tape cutter 104, operated by solenoid 105, is provided to cut tape 100 when desired.

The material handling system 14 is shown in detail in FIG. 1. Tape 100 (including backing 110) is stored on spool 118 and is passed over roller 120, between rollers 122 and 124, over roller 126 supported by dancing arm 128, up over roller 130 and down into the guide 102 which is coupled at its lower end to the lower carriage 44 by guide support 107. Spool 118 is supported on post 132 and rollers 120, 122, 126, 130 and dancing arm 128 are supported on structure 134, structure 134 and post 132 being supported on platform 82. Bracket 136, affixed to structure 134, flexibly supports guide 102 so that guide 102 can move in the Z direction in response to any Z direction motion of lower carriage 44. In operation, as tape 100 is pulled down through guide 102 by primary roller 96, the dancing arm 128 is pulled up towards rollers 124 and 130. When the dancing arm 128 reaches a selected height it contacts microswitch 138 mounted on structure 134 and activates a motor 99 which drives roller 124 and draws tape 100 off the spool 118. Since tape 100 is drawn off the spool 118 at a rate faster than it is pulled by primary roller 96, dancing arm 128 drops until it contacts microswitch 140 mounted on bracket 136 which deactivates motor 99 driving roller 124. The dancing arm 128 is then pulled up again by the pulling action of primary roller 96 on the tape 100. Through this process, the tape 100 is kept under a constant tension even through stopping and starting of the primary roller 96.

In operation, power is supplied to motors 20, 32, 50 and 60 to move upper carriage 12 and lower carriage 44, and thus the material handling system 14 and the laying head 46, to the position where the tape 100 is to be laid on the lay-up tool 40. Transducers 142 and 144 are provided to control the application of power to motors 32 and 20, respectively, so that the upper carriage 12 is slaved to the movement of the lower carriage 44. Transducer 142 consists of a cylinder 142a affixed to the beam 42 and a rod 142b inserted in the cylinder 142a and affixed by member 142c to the beam 26 supporting the upper carriage 12. Any motion of the lower carriage 44 in the X direction not accompanied by a like motion of the upper carriage 12 will cause a relative motion of the cylinder 142a and the rod 142b which will generate an output signal and cause motor 32 to be actuated. Similarly, transducer 144 consists of a cylinder 144a affixed to winding 48 of motor 50 and a rod 144b inserted in the cylinder 144a and spring loaded against member 144c affixed to the upper carriage 12. Any motion of the lower carriage 44 in the Y direction not accompanied by a like motion of the upper carriage 12 will cause a relative motion of the cylinder 144a and the rod 144b which will generate an output signal and cause motor 20 to be actuated. Once the laying head 46 is in position, motors 72 and 94 are actuated simultaneously to rotate the laying head 46 and the material handling system 14 to the proper direction. The gearings of motors 72 and 94 are designed so that the rotation of plate 82 carrying the material handling system 14 is synchronized with the rotation of plate 64 carrying the laying head 46.

The laying head 46 is then lowered to the surface of the lay-up tool 40 by activation of motors 80 and a selected amount of force is applied in the Z direction to press the tape 100 against the surface of the lay-up tool 40. Power is then selectively applied by a controller 145 to the above-cited motors and to motors 99 and 116 so that the tape 100 can be laid in a selected pattern on the surface of the lay-up tool 40. Worm screw drive nuts 78 are loosely mounted between plates 79 in apertures 77 in lower carriage 44 so that upper carriage 12, slaved to lower carriage 44, does not have to follow lower carriage 44 with the same degree of precision as is required for the motion of lower carriage 44 to enable laying head 46 to precisely lay up tape 100. The height of laying head 46 in the Z direction is controlled to allow multiple layers of tape 100 to be laid down and the pressure in the Z direction is controlled to enable the syntactic resin layer described in U.S. Pat. No. 4,284,679 to properly flow when the tape 100 is crossed over itself in multiple passes to make reticulated structures. If little or no pressure is required in the Z direction, the Z direction drive system described above can be replaced by a motor 146, shown in phantom FIG. 5, which would drive a worm screw drive shaft (replacing shaft 53) and a worm screw drive nut (replacing bearing 55).

An automated lay-up machine has thus been described in which the heavy and bulky material handling system has been disengaged from the laying head. The laying head which has a minimum of bulk and weight is carried by a rapid and accurate positioning and driving system and is fed material by the material handling system which is carried by a separate driving system slaved to the motion of the laying head. With this description in mind, it is obvious that numerous modifications and departures may be made by those skilled in the art; thus, the invention is to be construed as being limited only by the spirit and scope of the appended claims.

INDUSTRIAL APPLICABILITY

The automated lay-up machine is useful in the manufacture of laminated or reticulated composite structures.

I claim:

1. A lay-up machine for laying up material comprising:
    supply means for supplying said material;
    upper carriage means adapted to carry said supply means and having a selected number of degrees of freedom of movement to allow positioning of said supply means;
    means for moving said upper carriage means;
    laying means adapted to receive said material from said supply means;
    lower carriage means adapted to carry said laying means and having a selected number of degrees of freedom of movement to control the position of said laying means;
    means for moving said lower carriage means; and
    means for slaving the motion of said upper carriage means to the motion of said lower carriage means.

2. The lay-up machine of claim 1 further comprising means for moving said laying means relative to said upper carriage means.

3. The lay-up machine of claim 2 wherein said means for moving said laying means includes means coupled to said lower carriage means for moving said laying means toward and away from the plane of said upper carriage means.

4. The lay-up machine of claim 2 wherein said means for moving said laying means includes means for moving said laying means rotationally with respect to said lower carriage means.

5. The lay-up machine of claim 4 further comprising:
    means for rotationally moving said supply means relative to said upper carriage means; and
    means for slaving the rotational motion of said supply means to the rotational motion of said laying means.

6. The lay-up machine of claim 2 further comprising:
    means for moving said supply means relative to said upper carriage means; and
    means for slaving the motion of said supply means to the motion of said laying means.

7. The lay-up machine of claim 2 wherein said means for moving said laying means includes means coupled to said upper carriage means and said lower carriage means for moving said laying means toward and away from the plane of said upper carriage means.

8. The lay-up machine of claim 7 wherein said means coupled to said upper carriage means is loosely coupled to said lower carriage means to permit relative movement therebetween.

9. The lay-up machine of claim 1 further comprising means for moving said supply means relative to said upper carriage means.

10. The lay-up machine of claim 9 wherein said means for moving said supply means includes means for moving said supply means rotationally with respect to said upper carriage means.

11. The lay-up machine of claim 1 wherein said slaving means includes transducer means coupled to said upper and lower carriage means for sensing the relative motion thereof and generating an output signal in response to said relative motion to control said means for moving said upper carriage means.

12. The lay-up machine of claim 1 further comprising controller means.

* * * * *